UNITED STATES PATENT OFFICE.

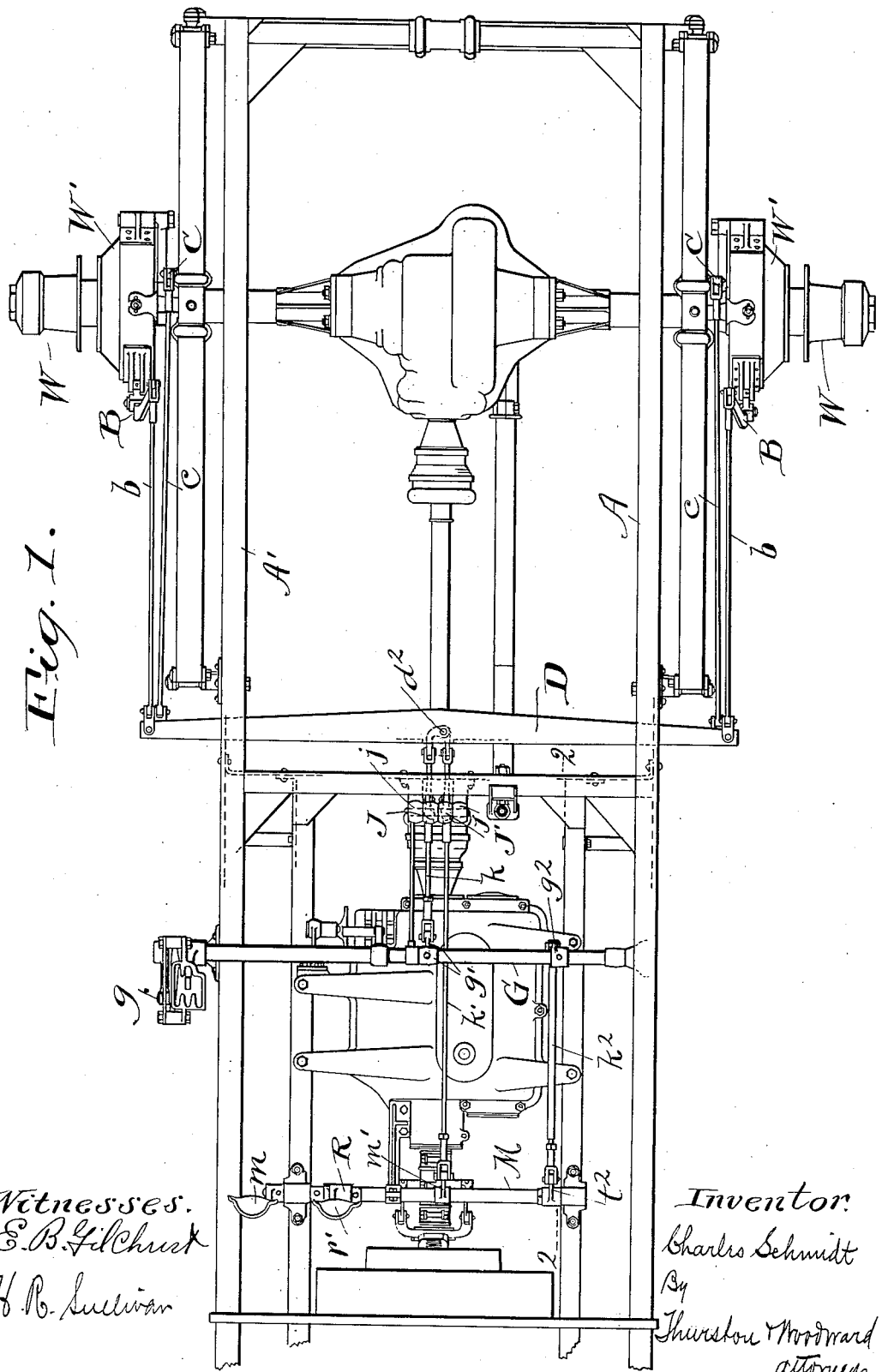

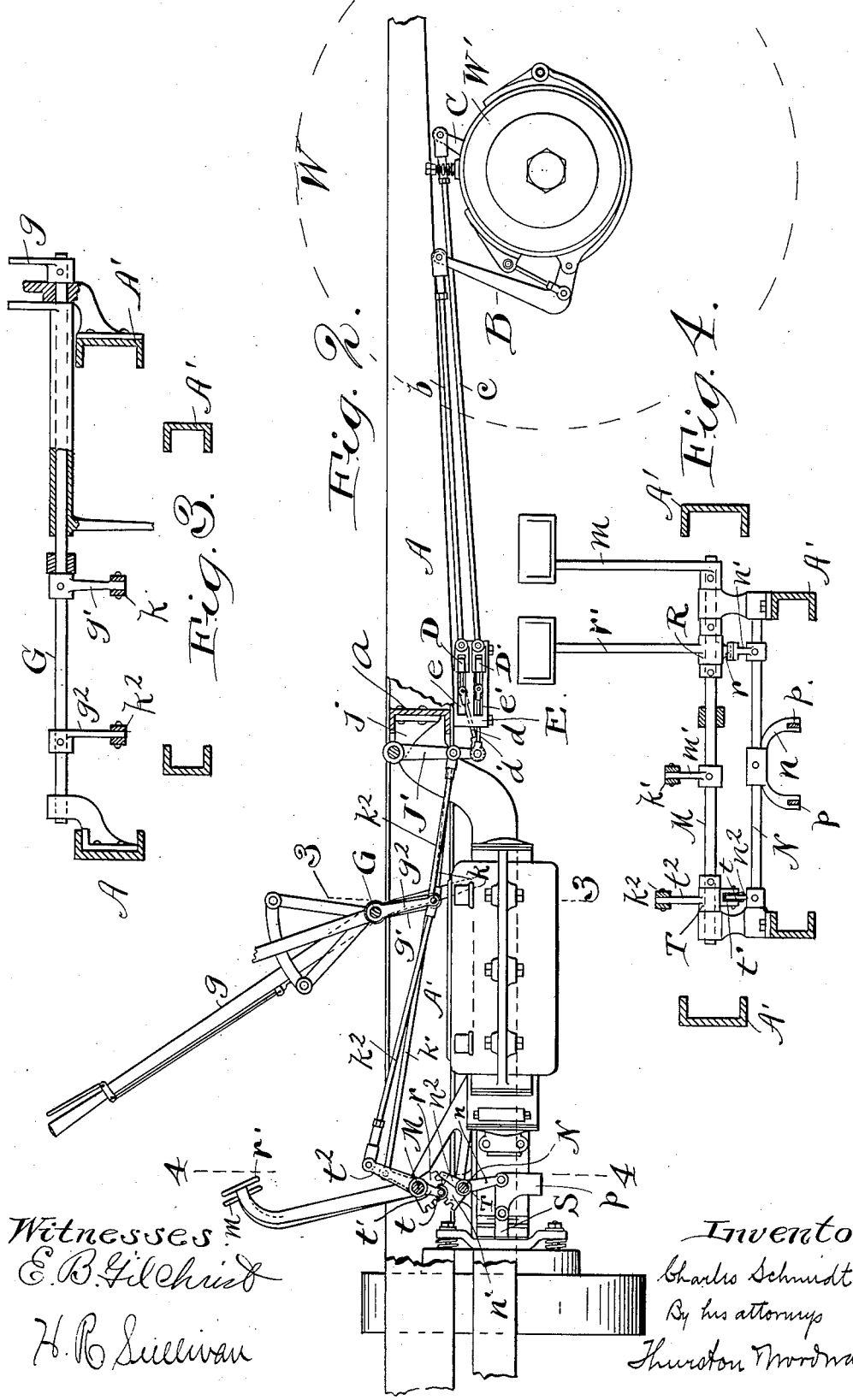

CHARLES SCHMIDT, OF CLEVELAND, OHIO, ASSIGNOR TO THE PEERLESS MOTOR CAR COMPANY, OF CLEVELAND, OHIO, A CORPORATION OF WEST VIRGINIA.

BRAKE AND CLUTCH OPERATING MECHANISM FOR AUTOMOBILES.

No. 883,835.  Specification of Letters Patent.  Patented April 7, 1908.

Application filed March 29, 1906. Serial No. 308,759.

*To all whom it may concern:*

Be it known that I, CHARLES SCHMIDT, a citizen of the Republic of France, residing at Cleveland, in the county of Cuyahoga and State of Ohio, have invented a certain new and useful Improvement in Brake and Clutch Operating Mechanism for Automobiles, of which the following is a full, clear, and exact description.

This invention relates to certain novel mechanism for operating the brakes and clutch on an automobile in an efficient manner, as will be hereinafter set forth, and definitely pointed out in the claims.

In the drawing, Figure 1 is a plan view of the middle and rear parts of the chassis of an automobile equipped with the present invention. Fig. 2 is a side elevation of the parts shown in Fig. 1, a portion of the same being in vertical section in the plane indicated by line 2—2, of Fig. 1. Fig. 3 is a sectional rear elevation in the plane of line 3—3, of Fig. 2, showing particularly the rock shaft G, and certain associated mechanism. Fig. 4 is a transverse sectional rear view in the plane indicated by line 4—4, showing, however, only the two rock shafts, M, and N, and their associated mechanism.

Each rear wheel, W, is provided with a brake engaging the outer surface of its hub drum, W', and with another brake engaging the inner surface of said hub drum. Brakes of this sort, in a variety of forms, are familiar with those acquainted with this art; wherefore, since any suitable construction of brakes may be employed, it has not been thought necessary to show brakes in detail. An operating lever, B, is provided for each external brake; and an operating lever, C, is provided for each internal brake. The forward movement of each of these brake levers sets the associated brake.

At a suitable distance in front of the rear wheels, a block, E, is secured to the under side of each of the two side members, A A', of the automobile frame. In each of these blocks there are two horizontal slots, respectively indicated by e, e'.

D D' represent equalizing bars whose ends pass respectively through the two slots, e, and the two slots e'; whereby the equalizing bars are supported and are permitted to slide forward and backward in said slots. The two brake operating levers, B, are respectively connected, by means of links, b b, with the ends of the equalizing bar, D. The two brake levers, C, are connected by means of links, c, with the ends of the equalizing bar, D'.

Associated with two equalizing bars respectively, are the two draft rods, d, d', each of which is connected with its associated equalizing bar by means of a vertical pivot pin, $d^2$, located about midway between the ends of said equalizing bar. The front ends of these draft rods are respectively connected with the two swinging levers, J, J', which are pivoted to brackets, j, secured to one of the transverse members, a, of the automobile frame. It is evident that by rocking the swinging lever, J, forward, the corresponding equalizing bar, D, will be moved forward, and thereby the outside brakes, controlled by levers, B, will be set, and will be set equally, because the equalizing bar, D, will turn on its pivotal connection with the draft bar, d, enough to pull with equal force upon the two links, b b; in like manner, through the operation of the swinging lever, J', the two inside brakes will be set with equal force. The equalizing of the braking pressure on the hubs of the two driving wheels is of great practical value in an automobile, since it greatly diminishes the tendency of the vehicle to "skid".

The transverse rock shaft, G, is mounted in suitable bearings secured to the automobile frame. An operating lever, g, is secured to this rock shaft, and furnishes the means for rocking the same. Two arms, g', $g^2$, are also rigidly fastened to this rock shaft. The arm g' is connected by a link, k, with the swinging lever, J, wherefore an operator, taking hold of the lever g, may, through the described mechanism set the external brakes.

M and N represent respectively two other transverse rock shafts mounted in suitable bearings secured to the frame one above the other. A foot lever, m, is rigidly fastened to the rock shaft, M, to which rock shaft is also secured a rigid arm, m'. A link, k', connects this arm with the swinging lever, J', wherefore an operator by pressing his foot against the lever m, may through the described intermediate mechanism, set the internal brakes with equal force against the wheel hubs.

Very clearly it is desirable, under some circumstances to uncouple the clutch as brakes are set. The rock shaft, N, is for operating the clutch, and it is provided with two separate arms, n, which are respectively connected by means of links, p, with the longitudinally sliding member, S, of the clutch. The clutch may, of course, be of any suitable construction, provided there is a longitudinally sliding member by which it may be opened and closed. Secured to the rock shaft, N, is a gear segment, n', which meshes with a gear segment, r, extending down from a sleeve, R, loosely mounted on the shaft, M,—this sleeve being provided with a foot lever, r'. By pressing upon this foot lever, the shaft N, is rocked in the direction to release the clutch; and obviously the clutch may thereby be released or allowed to throw on independently of the brake operating mechanism. There is, however, another arm, $n^2$, secured to the shaft N, which arm lies in the path of a pin, t, carried by a lever arm, t', said arm being rigid with a sleeve, T, loosely mounted on shaft, M. A lever arm, $t^2$, is also secured to sleeve T, and this arm is connected by means of a link, $k^2$, with the arm $g^2$, secured to the rock shaft, G. It is therefore apparent that when the latter shaft is rocked in that direction which sets the external brakes, the shaft, N, will also be rocked in the direction to uncouple the clutch.

The external brakes operated by the hand lever, g, are called the emergency brakes. It is to be used to set said brakes when it is desired to suddenly stop or check the forward movement of the car, and therefore the provision is made as above explained of simultaneously throwing off the clutch. The foot brake lever, m, is used under ordinary circumstances to bring the car slowly to a standstill after the clutch has been thrown out by the clutch-operating mechanism, or to slightly check the onward movement of the car without throwing out the clutch.

Having thus described my invention, I claim:

1. In an automobile, the combination of the two rear wheels having cylindrical braking surfaces and brakes, which engage with the braking surfaces on said rear wheels and are provided with operating levers, with an equalizing bar, supports secured to the automobile frame for sustaining said equalizing bar and permitting it to move forward and backward, links connecting the brake operating levers with said equalizing bar, a draft device connected with said equalizing bar, and mechanism for operating said draft device.

2. In an automobile, the combination of brakes acting on cylindrical braking surfaces secured to the rear wheels thereof, a transversely extended equalizing bar, longitudinally slotted blocks in which said equalizing bar is slidably supported, links connecting the ends of said equalizing bar with the operating mechanism of the brakes associated respectively with the two rear wheels, a draft rod pivotally connected with the equalizing bar near the middle thereof, and mechanism for operating said draft bar.

3. In an automobile, the combination of a brake, a rock shaft G, having two arms rigidly secured thereto, mechanism connecting one of said arms with the brake operating mechanism, a clutch, a rock shaft N, mechanism transmitting motion from said rock shaft to the clutch operating mechanism, an arm fixed to the rock shaft, N, a pivoted lever having one arm adapted to engage the arm last referred to, and a link connecting the other arm of said lever with the second arm on rock shaft G.

4. In an automobile, the combination of the driven rear wheels, a cylindrical braking flange secured to each of said wheels, an inside and outside brake for each of said flanges, each of which is provided with an operating lever, two equalizing bars extending crosswise of the machine, supports therefor upon which said equalizing bars are movable, links which connect opposite ends of one equalizing bar with the two operating levers of the outside brakes, links connecting the opposite ends of the other equalizing bar with the operating levers of the inside brakes, and two independently operable draft devices for said equalizing bars.

5. In an automobile, the combination of the two driven wheels, each of which is provided with a cylindrical braking surface, brakes respectively engaging with said cylindrical surfaces, each having an operating lever, an equalizing bar extending crosswise of the automobile frame, supports upon said frame for said equalizing bar and upon which it is movable, links respectively connecting the said operating levers with opposite ends of said equalizing bar, a downwardly depending swinging lever hung from the automobile frame, a link connecting it with said equalizing bar, and a draft appliance connected with said swinging lever.

6. In an automobile, the combination of a clutch, a rock shaft N, clutch operating mechanism connected with said rock shaft, and an operating arm $n^2$ also connected with said rock shaft, a second rock shaft M located adjacent to the rock shaft N, a sleeve T loosely mounted thereon having one arm adapted to engage with the operating arm $n^2$, a brake, and operating mechanism therefor which is also connected with the last mentioned sleeve, a sleeve R loosely mounted on the rock shaft M, a clutch operating lever secured thereto, and mechanism transmitting motion from said sleeve to the first mentioned rock shaft.

7. In an automobile, the combination of the rear wheels having hub drums, brakes acting on said hub drums, transversely extended equalizing bars, supports for said equalizing bars, links respectively connecting the ends of said equalizing bars with the brake operating levers, a draft bar connected with said equalizing bar by means of a vertical pivot located near the center of said equalizing bar, a swinging lever pivoted to the automobile frame and to said draft bar, a rock shaft having an arm fixed to it, a link connecting said arm with said swinging lever, and an operating lever secured to said rock shaft.

8. In an automobile, the combination with the rear wheels having hub drums, and an inside and an outside brake for each of said hub drums, with two transversely extended equalizing bars, supports for said equalizing bars, links connecting the ends of one of said equalizing bars with the operating levers of the two outside brakes, other links connecting the ends of the other equalizing bar with the operating levers of the two inside brakes, two draft bars respectively pivoted on vertical pivots to the two equalizing bars near the centers thereof, a rock shaft G, having an arm secured thereto, suitable connections between said arm and one of said draft rods, an operating lever secured to said rock shaft, a second rock shaft, M, having secured to it an arm which is connected with the other draft rod, an operating lever secured to the latter rock shaft, a clutch, a mechanism whereby the operation of the rock shaft G in the braking direction will release said clutch.

In testimony whereof, I hereunto affix my signature in the presence of two witnesses.

CHARLES SCHMIDT.

Witnesses:
E. L. THURSTON,
E. B. GILCHRIST.